United States Patent [19]

Sacripante et al.

[11] Patent Number: 5,348,832
[45] Date of Patent: Sep. 20, 1994

[54] TONER COMPOSITIONS

[75] Inventors: Guerino G. Sacripante; Raj D. Patel, both of Oakville; Grazyna E. Kmiecik-Lawrynowicz, Burlington, all of Canada

[73] Assignee: Xerox Corporation, Stamford, Conn.

[21] Appl. No.: 69,792

[22] Filed: Jun. 1, 1993

[51] Int. Cl.$^5$ .............................................. G03G 9/087
[52] U.S. Cl. .................................... 430/109; 430/137
[58] Field of Search ....................... 430/137, 105, 109

[56] References Cited

U.S. PATENT DOCUMENTS

| | | | |
|---|---|---|---|
| 3,564,008 | 2/1971 | Yamamoto et al. | 260/326.13 |
| 4,558,108 | 12/1985 | Alexandru et al. | 526/340 |
| 4,797,339 | 1/1989 | Maruyama et al. | 430/109 |
| 4,983,488 | 1/1991 | Tan et al. | 430/137 |
| 4,996,127 | 2/1991 | Hasegawa et al. | 430/109 |
| 5,227,273 | 7/1993 | Yoshida et al. | 430/137 |
| 5,236,629 | 8/1993 | Mahabadi et al. | 430/137 |

*Primary Examiner*—John Goodrow
*Attorney, Agent, or Firm*—E. O. Palazzo

[57] ABSTRACT

A toner composition comprised of pigment, and a sulfonated polyester of the formula or as essentially represented by the formula

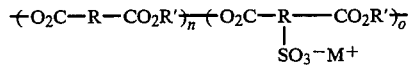

wherein M is an ion independently selected from the group consisting of hydrogen, ammonium, an alkali metal ion, an alkaline earth metal ion and a metal ion; R is independently selected from the group consisting of aryl and alkyl; R' is independently selected from the group consisting of alkyl and oxyalkylene; and wherein n and o represent random segments; and wherein the sum of n and o are equal to 100 mole percent.

28 Claims, No Drawings

TONER COMPOSITIONS

BACKGROUND OF THE INVENTION

This invention is generally directed to toner and developer compositions, and more specifically, the present invention is directed to developer and toner compositions containing a novel sulfonated polyester resin, and process for the preparation thereof. In embodiments, there are provided in accordance with the present invention, toner compositions comprised of certain sulfonated polyester resin particles and pigment particles comprised of, for example, carbon black, cyan, magenta, or yellow, thereby providing for the development and generation of black and/or colored images. In embodiments, there are provided in accordance with the present invention processes for the preparation of toner and developer compositions, and more specifically emulsion aggregation toner processes. In embodiments, the present invention relates to processes which comprise the preparation of a sulfonated polyester resin represented by the formula

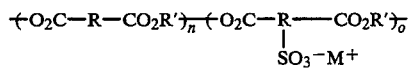

derived from at least one dicarboxylic acid or diester component, at least one diol component, and at least 0.5 mole percent to about 8 mole percent of a sulfonated difunctional monomer, and wherein M is an ion such as hydrogen, ammonium, lithium, sodium, potassium, an alkali earth or a metal ion; R and R' are as illustrated herein such as alkyl, aryl, oxyalkylene and the sum of o+n equals 100 percent, and o is preferably from about 0.5 to about 8 mole percent. In another embodiment, the present invention relates to an in situ process for the preparation of toner compositions which comprises homogenizing a polymer, especially a sulfonated polyester resin utilizing a Gaulin homogenizer, available from APV Gaulin Incorporated, containing an aqueous solution containing an ionic and nonionic surfactant at a temperature of from about 120° C. to about 170° C., subsequently homogenizing the mixture and generating suspended particles of about 0.05 micron to about 2 microns in volume diameter; aggregating the resulting microsuspension with a mixture of cationic surfactant, pigment and optional charge enhancing additives in an aqueous solution; followed by coalescence of the aggregates by heating thereby providing toner particles with an average particle volume diameter of from between about 3 to about 21 microns. The present invention is thus directed to a toner composition comprised of a sulfonated polyester and the economical preparation of toners without the utilization of the known pulverization and/or classification methods, and wherein toners with an average volume diameter of from about 3 to about 21 microns can be obtained. The resulting toners can be selected for known electrophotographic imaging and printing processes, including color processes, and lithography. In embodiments, the present invention is directed to a process comprised of homogenizing a molten resin, preferably a sulfonated polyester resin, exhibiting a melt viscosity of from about 10 poise to about 10,000 poise in a sealed vessel heated of from about 120° to about 170° C. containing an aqueous solution comprised of at least two surfactants, wherein one surfactant is nonionic and the other is ionic, thereby generating suspended resin particles from about 0.05 micron to about 2 microns in volume diameter, followed by cooling the mixture to below the glass transition temperature of the resin of from about 45° to about 65° C., and subsequently aggregating the aforementioned suspended particles with an aqueous mixture of pigment, counterionic surfactant and optionally charge control additives to generate toner aggregates with an average particle volume diameter of from about 3 to about 21 microns, followed by heating the toner aggregates above the glass transition temperature causing coalescence of the toner aggregates to toner composites with an average particle volume diameter of from about 3 to about 21 microns. In embodiments, the present invention is directed to a process comprised of homogenizing a sulfonated polyester, such as one derived from about 42 mole percent to about 49.5 mole percent of a dicarboxylic diester monomer such as dimethylterephthalate, about 50 mole percent of a diol such as propylene glycol or diethylene glycol, and from about 0.5 to about 8 mole percent of a sulfonated difunctional monomer, such as dimethyl 5-sulfo-isophthalate sodium salt, in an aqueous solution containing at least two surfactants, one of which is a nonionic surfactant of from about 0.1 to about 5 percent by volume of an aqueous fraction such as polyethylene glycol nonyl phenyl ether, and the other or second surfactant is an ionic surfactant such as dodecyl benzene sulfonate sodium salt of from about 0.1 to about 1.5 percent by volume of the aqueous fraction in a heated pressurized vessel at high temperature of, for example, from about 120° C. to about 170° C., which vessel contains a Gaulin homogenizer, operated at from about 1,000 to about 10,000 revolutions per minute for a duration of from about 1 minute to about 3 hours, thereby generating suspended particles of from about 0.01 micron to about 2 microns in volume average diameter; followed by cooling the mixture to ambient temperature of from about 10° C. to about 40° C. and adding thereto a mixture comprised of from about 1 to about 10 percent by weight of pigment particles, such as carbon black, or other colored pigments like HELIOGEN BLUE ™ or HOSTAPERM PINK ™ in an aqueous mixture containing from about 0.1 to about 5 percent by volume of a counterionic surfactant such as alkylbenzene tetraalkylammonium chloride; followed by dispersing the resulting mixture and thereby obtaining suspended aggregate particles of from about 2 microns to about 21 microns in volume diameter; followed by coalescence of the aforementioned aggregated pigment-sulfonated polyester particles by heating to a temperature of from about 5° C. to about 40° C. above the glass transition temperature of the resin particle to generate toners with an average particle diameter of from about 3 to about 21 microns in volume average diameter. The aforementioned toners are especially useful for the development, especially xerographic development, reference U.S. Pat. No. 4,265,990, the disclosure of which is totally incorporated herein by reference, of colored images with excellent line and solid resolution, and wherein substantially no background deposits are present.

In color reprography, especially process color reprography wherein pictorial images are generated, high gloss of from about 50 gloss units to about 80 gloss units as measured by the Gardner Gloss meter is highly desirable. Additionally, toners which fix onto paper at low fusing temperatures, such as from about 125° C. to about 140° C., are desirable to prolong the lifetime of the fuser and reduce its energy consumption. Accordingly, in order to satisfy the aforementioned high gloss and low fusing temperature requirements, it is advantageous to utilize conventional toners comprised of polyesters as the resin binder. However, the process for obtaining conventional toners usually requires the utilization of pulverization and cumbersome classification methods which are expensive, especially wherein small size toners of from about 3 microns to about 7 microns are desired. The toner process of this invention is directed to the economical preparation of toners containing, for example, polyester resins without the utilization of the known pulverization and attrition methods, and wherein a solvent is not needed, and wherein toners with an average volume diameter of from about 3 to about 7 microns can be obtained. Additionally, with the toners of this invention, high gloss of from about 50 to about 80 gloss units as measured by the Gardner gloss meter, and low fixing temperature of from about 125° C. to about 150° C. are attained in embodiments.

Certain in situ emulsion aggregation processes are known, and usually involve the use of polar emulsion resins, which are, for instance, comprised of an acidic functionality such as carboxylic acids or basic functionalities such as a tertiary or a quaternized amine to render the polymeric resin highly charged necessary for the controlled aggregation step with a pigment, by properly mixing the ionic and counterionic surfactants, followed by coalescence. The preparation of addition type emulsion resins with polar groups such as styrene acrylate-acrylic acid or methacrylic acid in the main chain wherein the acid group is from about 2 to about 8 percent of the polymer chain are known and utilized in the aggregation and coalescence step, wherein the resins have sufficient charge, such as mentioned in U.S. Pat. No. 4,996,127. However, such addition type polymeric resin is not effective for toner compositions wherein a low fixing temperature of from about 125° C. to about 140° C. is required with high gloss of from about 50 to about 80 gloss units as measured by the Gardner gloss meter, and nonvinyl offset properties such that the image does not offset to vinyl covers utilized in binding the images. Hence, there is a need for polyester based toner compositions wherein the aforementioned low fixing temperature, high gloss and nonvinyl offset properties are attained, and moreover there is a need for the preparation of toner by an economical in situ process which does not require the utilization of pulverization and cumbersome classification methods. Also, certain polyesters are considered neutral with low acid values present at the chain ends, and thus they usually do not provide the high polar charge necessary for proper aggregation control. In the present invention, a novel sulfonated polyester is utilized, wherein the sulfonated ion is present in the main chain of the polyester in an amount of, for example, from about 0.5 to about 8 percent by weight thereby providing adequate charging characteristics for effective use in in situ emulsion aggregation processes, and enabling the generation of toner particles comprised of sulfonated polyesters with a number of advantages, including a low fixing temperature of from about 120° C. to about 140° C., high gloss of from about 50 to about 80 gloss units as measured by the Gardner gloss metering unit, nonvinyl offset characteristics, and avoidance of charge control agents in embodiments.

There is illustrated in U.S. Pat. No. 4,996,127 a toner of associated particles of secondary particles comprising primary particles of a polymer having acidic or basic polar groups and a coloring agent. The polymers selected for the toners of this '127 patent can be prepared by an emulsion polymerization method, see for example columns 4 and 5 of this patent. In column 7 of this '127 patent, it is indicated that the toner can be prepared by mixing the required amount of coloring agent and optional charge additive with an emulsion of the polymer having an acidic or basic polar group obtained by emulsion polymerization. Additionally, this process involves the preparation of emulsion addition type resins, such as that obtained from styrene, ethyl acrylate and the like, and wherein it is believed that polyesters cannot be effectively obtained. Also, note column 9, lines 50 to 55, wherein a polar monomer such as acrylic acid in the emulsion resin is necessary, and toner preparation is not obtained without the use, for example, of acrylic acid polar group, see Comparative Example I of the '127 patent. With the present invention, polyester resins are utilized, and more specifically sulfonated polyester emulsions with polar charges induced by the sulfonated ion groups, and wherein the emulsion particles are prepared by a high shear and high temperature processes. In U.S. Pat. No. 4,983,488, there is disclosed a process for the preparation of toners by the polymerization of a polymerizable monomer dispersed by emulsification in the presence of a colorant and/or a magnetic powder to prepare a principal resin component and then effecting coagulation of the resulting polymerization liquid in such a manner that the particles in the liquid after coagulation have diameters suitable for a toner. It is indicated in column 9 of this patent that coagulated particles of 1 to 100, and particularly 3 to 70, are obtained. This process is thus directed to emulsion type resins and monomers therefrom, and coagulants are utilized. With the process of the present invention, addition type resins are avoided and sulfonated polyester resin particles are selected thereby enabling low toner fusing temperatures and high gloss with nonvinyl offset properties, and without the use of charge control agents. Similarly, the aforementioned disadvantages are noted in other prior art, such as U.S. Pat. No. 4,797,339, wherein there is disclosed a process for the preparation of toners by resin emulsion polymerization and spray drying; and U.S. Pat. No. 4,558,108, wherein there is disclosed a process for the preparation of a copolymer of styrene and butadiene by specific suspension polymerization processes. More specifically, the present invention is directed to a toner comprised of a sulfonated polyester resin prepared by an in situ emulsion aggregation, which sulfonated polyester is microsuspended to from about 0.05 to about 1 micron in volume diameter utilizing a high shearing device, such as a Gaulin homogenizer, at elevated temperature followed by cooling to ambient temperature, aggregating with pigmented particles and counterionic surfactant to toner size pigment-resin aggregated particles of from about 3 microns to about 7 microns in volume diameter as measured by the Coulter Counter, followed by heating the resulting aggregate composite above the glass transition resin of the polyester to effect coalescence and to generate toner particles of from about 3 to about 21 microns. These toners exhibit low fixing temperatures of from about 125° to about 140° C., high gloss of from about 50 to about 80 gloss units as measured by the Gardner Gloss device, excellent triboelectric charge induced, it is believed, by the sulfonated ion groups on the polyester resin, hence avoiding or minimizing the use of charge control agents.

Illustrated in U.S. Pat. No. 5,290,654 is an in situ process for the preparation of toner compositions which comprises dispersing a polymer, a pigment and an optional charge enhancing additive in an aqueous media containing a surfactant, or mixture of surfactants; stirring the mixture with optional heating to remove the organic solvent thereby obtaining suspended particles of about 0.05 micron to about 2 microns in volume diameter; subsequently homogenizing the resulting suspension with an optional pigment in water and surfactant; and followed by aggregating the mixture by heating thereby providing toner particles with an average particle volume diameter of from between about 3 to about 21 microns when said pigment is present. Disadvantages associated with this process include the use of solvents that can be toxic, which solvent is to be disposed of, or redistilled before reuse; thus, for example, adding to the process cost. Additionally, the polyesters of U.S. Pat. No. 5,290,654 do not contain sulfonated groups, hence are not polar charged and do not provide, it is believed, process latitude. Furthermore, with the sulfonated polyester of the present invention, excellent negative triboelectrification of toners with carriers are obtained, such as from about −10 to about −80 microcoulombs per gram, especially when the Xerox Corporation 9200 carrier comprised of, for example, a ferrite or steel core with a polymeric coating thereover of a terpolymer of styrene, methacrylate and an organosiloxane, and excellent admix properties are obtained, such as from about 30 seconds to about 2 minutes, without the use of charge control agents.

There is also disclosed in a Japanese Laid Open Patent H4-51251, a process for the preparation of polyester emulsion particles and toners comprised of a mixture of styrene based particles with polyester particles, however, the sulfonated polyesters of the present invention are not mentioned, and additionally pH adjusting agents must be utilized with the process of the H4-51251 patent and in situ toner particles comprised of exclusively a polyester resin with pigment and optionally charge control agent are not disclosed and cannot be obtained due to the nonpolar nature of the polyester utilized. The present invention discloses sulfonated polyester particles which are polar charged due to the sulfonated ions, and hence do not require pH adjusting agents during the process, and can be aggregated and coalesced with pigments and without the use of polar charged styrene based particles and without the use of charge control agents.

Water soluble sulfonated polyester resins are also known, such as illustrated in U.S. Pat. No. 3,564,008 wherein water-dissipatible sulfonated polyesters useful for sizing textiles, such as yarn, hemp rope and tie cord, are disclosed and wherein the polyester is derived from one dicarboxylic acid component, at least one diol component being a poly(ethylene glycol), and a difunctional monomer containing a metal sulfonate group attached to an aromatic nucleus. In the '008 patent, a sulfomonomer component constitutes at least about 8 mole percent to about 45 mole percent of the polyester to achieve water-dissipatibility. Furthermore, sulfonated water-dissipatible polyester amides are disclosed in U.S. Pat. No. 3,779,993 which in addition to the polyesters of the '008 patent include amine monomers.

There is a need for a toner composition of low fixing temperature of from about 125° to about 140° C. with high gloss of from about 20 to about 50 gloss units and wherein toner offset to vinyl covers is avoided or minimized, and moreover there is a need for an economical in situ preparation without resorting to conventional pulverization and classification process. There is also a need for toner compositions containing no charge control agents to provide for excellent toner triboelectrification and admix properties. These and other needs are attained with this invention in embodiments by providing a toner composition comprised of a pigment, optionally a charge control additive, and a sulfonated polyester resin, and wherein the toner can be prepared from an in situ emulsion aggregation process as illustrated herein.

SUMMARY OF THE INVENTION

It is an object of the present invention to provide toner and developer compositions with many of the advantages illustrated herein.

In another object of the present invention there are provided toner compositions with sulfonated polyester resins, and which toners are useful for the development of electrostatic latent images including color images.

In yet another object of the present invention there are provided processes for the preparation of toner compositions comprised of a sulfonated polyester, pigment and optional charge control agent.

Moreover, in another object of the present invention there are provided toner compositions comprised of a sulfonated polyester with low melt fusing temperatures of from about 125° C. to about 140° C.

Moreover, in another object of the present invention that are provided toner compositions comprised of a sulfonated polyester with a high gloss of from about 40 to about 80 gloss units, and which polyesters can be prepared without utilizing solvents and with high shearing.

In yet another object of the present invention there are provided in situ toners with excellent triboelectrification and excellent admix properties.

Moreover, in another object of the present invention that are provided toner compositions comprised of a sulfonated polyester with nonvinyl offset properties.

Moreover, in another object of the present invention that are provided toner compositions comprised of a sulfonated polyester derived from at least one dicarboxylic acid or diester component, at least one diol component, and at least from about 0.5 to about 8 mole percent of a sulfonated difunctional monomer.

In another object of the present invention there are provided simple and economical in situ processes for black and colored toner compositions by an in situ emulsion aggregation process and, more specifically, by heating a polyester like SPAR II ™ with pigment to a low melt viscosity state in a pressure reactor containing an aqueous surfactant solution, followed by dispersing the mixture and subsequently aggregation.

In a further object of the present invention there is provided a process for the preparation of toners with an average particle diameter of from between about 3 to about 50 microns, and preferably from about 3 to about 21 microns.

In another object of the present invention there are provided in situ toners prepared by dispersing certain polyester resins, pigment and optional toner additives at elected temperatures in a pressurized vessel containing an aqueous solution of ionic and nonionic surfactants, such as sodium dodecylsulfate and polypropylene glycol nonyl phenyl ether to yield directly toner sized particles or emulsion sized particles, followed by aggregation.

These and other objects of the present invention are accomplished in embodiments by the provision of toners and processes thereof. In embodiments of the present invention, there are provided toner compositions comprised of a sulfonated polyester resin of the formula illustrated herein, and processes for the economical direct preparation of toners by an emulsion suspension, aggregation process.

The polyesters of the present invention can be considered sulfonated polyesters obtained from the melt esterification of at least one, such as 1 to about 10 and preferably from one to two, dicarboxylic acid or diester components, such as dimethyl terephthalate, isophthalic acid or mixtures of such components with from about 42 mole percent to about 49.5 mole percent of the polyester, at least one, that is preferably one or two, diol components such as 1,2-propylene glycol, or propoxylated bisphenol A diethylene glycol or mixtures of the diol components with from about 50 mole percent of the polyester resin, a sulfonated difunctional monomer such as dimethyl-5-sulfo-isophthalate sodium salt, or sodium 2-sulfo-phthalic anhydride or mixtures of such components which is from about 0.5 to about 8 mole percent of polyester, and using a polycondensation catalyst such as dibutyl tin oxide hydroxide of from about 0.01 to about 0.1 mole percent of the polyester. The toners of the present invention can be prepared by an in situ emulsion aggregation process comprised of the steps of (a) homogenizing from about 80 to about 97 percent by toner weight of a sulfonated polyester resin comprised, for example, of about 42 mole percent of terephthalate, 50 mole percent of 1,2-propylene glycol, and 8 mole percent of sodio 5-sulfonoisophthalate in an aqueous mixture containing about 1.5 percent by weight of sodium dodecyl benzene sulfonate, and 1.5 percent by weight of propylene glycol nonylphenyl ether available from Rhoune-Poulenac as Antarox 897, utilizing a Gaulin homogenizer available from APV Gaulin Incorporated, and which mixture is heated at from about 120° C. to about 160° C. at a speed of from about 4,000 revolutions per minute to about 10,000 revolutions per minute for a duration of from about 1 minute to about 1 hour thereby generating suspended sulfonated polyester particles of from about 0.01 micron to about 2 microns in average particle diameter; (b) subsequently adding to the resulting emulsion suspension a pigment dispersion comprised of about 3 to about 7 percent by weight of toner of a pigment such as cyan, magenta, yellow, black, and the like, such as HOSTAPERM PINK TM, in an aqueous mixture containing a counterionic surfactant such alkylbenzene tetraalkylammonium chloride of from about 1.5 percent by weight and resulting in the aggregation of resin particles and pigment of from about 3 to about 21 microns; (c) heating the said pigment-resin aggregates at from about 5° C. to about 40° C. above the glass transition temperature of the resin for a duration of from about 30 minutes to about 6 hours thereby providing toner particles with an average particle volume diameter of from between about 1 to about 100 microns, and preferably from between about 3 to about 21 microns; and (d) cooling the mixture to ambient temperature, about 25° C., washing with water from about three to about six times, and drying the toner product by known methods such as fluid bed dryer.

Specific examples of the diol utilized for the derivation of the sulfonated polyesters of this invention are selected from the group consisting of ethylene glycol, 1,2-propylene glycol, 1,3-propylene glycol, 1,2-butylene glycol, 1,3-butylene glycol, 1,4-butylene glycol, 1,2-pentylene glycol, 1,3-pentylene glycol, 1,4-pentylene glycol, 1,5-pentylene glycol, 1,2-hexylene glycol, 1,3-hexylene glycol, 1,4-hexylene glycol, 1,5-hexylene glycol, 1,6-hexylene glycol, heptylene glycols, octylene glycols, decylne glycol, dodecylyne glycol, 2,2-dimethyl propane diol, propoxylated bisphenol A, ethoxylated bisphenol A, 1,4-cyclohexane diol, 1,3-cyclohexane diol, 1,2-cyclohexane diol, 1,2-cyclohexane dimethanol, 2-propene-diol, mixtures thereof and the like, and which diols are employed in effective amounts of, for example, from about 45 to about 55 mole percent by weight of the resin.

Specific examples of dicarboxylic acids utilized in preparing the aforementioned sulfonated polyesters, include malonic acid, succinic acid, 2-methyl succinic acid, 2,3-dimethylsuccinic acid, dodecylsuccinic acid, glutaric acid, adipic acid, 2-methyladipic acid, pimelic acid, azeilic acid, sebacic acid, terephthalic acid, isophthalic acid, phthalic acid, 1,2-cyclohexanedioic acid, 1,3-cyclohexanedioic acid, 1,4-cyclohexanedioic acid, glutaric anhydride, succinic anhydride, dodecylsuccinic anhydride, mixtures thereof in effective amounts of, for example, from about 45 to about 55 mole percent by weight of the resin.

Specific examples of dicarboxylic diesters utilized in preparing the aforementioned sulfonated polyesters, include alkyl esters, wherein the alkyl groups contain from 1 to about 23 carbons and are esters of malonate, succinate, 2-methyl succinate 2,3-dimethyl succinate, dodecyl succinate, glutarate, adipic acid, 2-methyladipate, pimelate, azeilate, sebacate acid, terephthalate, isophthalate, phthalate, 1,2-cyclohexanedioate, 1,3-cyclohexanedioate, 1,4-cyclohexanedioate, mixture thereof and the like. Effective diester amounts of, for example, from about 45 to about 55 mole percent by weight of the resin are selected.

Specific examples of sulfonated difunctional monomers utilized in preparing the aforementioned sulfonated polyesters include the ion salts of sulfonated difunctional monomers wherein the ion is a hydrogen, ammonium, an alkali or alkaline earth such as lithium, sodium, potassium, cesium, magnesium, barium, or a metal ion such as vanadium, copper, iron cobalt, manganese, mixtures thereof and the like, and the sulfonated difunctional moiety is selected from the group including dimethyl-5-sulfo-isophthalate, dialkyl-5-sulfo-isophthalate-4-sulfo-1,8-naphthalic anhydride, 4-sulfo-phthalic acid, dimethyl 4-sulfo-phthalate, dialkyl 4-sulfo-phthalate, 4-sulfophenyl-3,5-dicarbomethoxybenzene, 6-sulfo-2-naphthyl-3,5-dicarbomethoxybenzene, sulfo-terephthalic acid, dimethyl-sulfo-terephthalate, dialkyl-sulfo-terephthalate, sulfo-ethanediol, 2-sulfopropanediol, 2-sulfobutanediol, 3-sulfopentanediol, 2-sulfo hexanediol, 3-sulfo-2-methylpentanediol, 2-sulfo-3,3-dimethylpentanediol, sulfo-p-hydroxybenzoic acid, mixtures thereof and the like. Effective difunctional amounts of, for example, from about 0.5 to about 8 mole percent by weight of the resin are selected. Two preferred monomers are dimethyl-5-sulfo-isophthalate sodium salt, and N,N-bis(2-hydroxyethyl)-2-aminoethane sulfonate available as BES from Aldrich Chemical Company.

Various known colorants present in the toner in an effective amount of, for example, from about 1 to about 25 percent by weight of the toner, and preferably in an amount of from about 1 to about 15 weight percent, that can be selected include carbon black like REGAL 330®. As colored pigments, there can be selected known cyan, magenta, or yellow. Specific examples of pigments include HELIOGEN BLUE L6900 ™, D6840 ™, D7080 ™, D7020 ™, PYLAM OIL BLUE ™, PYLAM OIL YELLOW ™, PIGMENT BLUE 1 ™ available from Paul Uhlich & Company, Inc., PIGMENT VIOLET 1 ™, PIGMENT RED 48 ™, LEMON CHROME YELLOW DCC 1026 ™, E.D. TOLUIDINE RED ™ and BON RED C ™ available from Dominion Color Corporation, Ltd., Toronto, Ontario, NOVAPERM YELLOW FGL ™, HOSTAPERM PINK E ™ from Hoechst, and CINQUASIA MAGENTA ™ available from E.I. DuPont de Nemours & Company, and the like. Generally, colored pigments that can be selected are cyan, magenta, or yellow pigments. Examples of magenta materials that may be selected as pigments include, for example, 2,9-dimethyl-substituted quinacridone and anthraquinone dye identified in the Color Index as CI 60710, CI Dispersed Red 15, diazo dye identified in the Color Index as CI 26050, CI Solvent Red 19, and the like. Illustrative examples of cyan materials that may be used as pigments include copper tetra-(octadecyl sulfonamido) phthalocyanine, x-copper phthalocyanine pigment listed in the Color Index as CI 74160, CI Pigment Blue, and Anthrathrene Blue, identified in the Color Index as CI 69810, Special Blue X-2137, and the like; while illustrative examples of yellow pigments that may be selected are diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33 2,5-dimethoxy-4-sulfonanilide phenylazo-4'-chloro-2,5-dimethoxy acetoacetanilide, and Permanent Yellow FGL. Cyan components may also be selected as pigments with the process of the present invention. The pigments selected are present in various effective amounts, such as from about 1 weight percent to about 15 weight percent, and preferably from 1 to about 10 weight percent of the toner.

The toner may also include known charge additives such as alkyl pyridinium halides, bisulfates, the charge control additives of U.S. Pat. Nos. 3,944,493; 4,007,293; 4,079,014; 4,394,430 and 4,560,635, which illustrates a toner with a distearyl dimethyl ammonium methyl sulfate charge additive, the disclosures of which are totally incorporated herein by reference, and the like.

Surface additives that can be added to the toner compositions of the present invention include, for example, metal salts, metal salts of fatty acids, colloidal silicas, mixtures thereof and the like, which additives are usually present in an amount of from about 0.1 to about 1 weight percent, reference U.S. Pat. Nos. 3,590,000; 3,720,617; 3,655,374 and 3,983,045, the disclosures of which are totally incorporated herein by reference. Preferred additives include zinc stearate and AEROSIL R972 ® available from Degussa.

Surfactants in effective amounts of, for example, 0.1 to about 25 weight percent in embodiments include, for example, non ionic surfactants such as polyvinyl alcohol, polyacrylic acid, methalose, methyl cellulose, ethyl cellulose, propyl cellulose, hydroxy ethyl cellulose, carboxy methyl cellulose, polyoxyethylene cetyl ether, polyoxyethylene lauryl ether, polyoxyethylene octyl ether, polyoxyethylene octyphenyl ether, polyoxyethylene oleyl ether, polyoxyethylene sorbitan monolaurate, polyoxyethylene stearyl ether, polyoxyethylene nonylphenyl ether (available from GAF as IGEPAL CA-210 ™, IGEPAL CA-520 ™, IGEPAL CA-720 ™, IGEPAL CO-890 ™, IGEPAL CO-720 ™, IGEPAL CO-290 ™, IGEPAL CA-210 ™, ANTAROX 890 ™ and ANTAROX 897 ™ available from Rhone-Poulenac, dialkylphenoxy poly(ethyleneoxy)ethanol, ionic surfactants such as sodium dodecyl sulfate, sodium dodecyl-benzene sulfate, sodium dodecylnaphthalene sulfate, dialkyl benzenealkyl ammonium chloride, MIRAPOL ™, SANIZOL ™, mixtures thereof and the like. The surfactant is utilized in various effective amounts, and preferably, for example, from about 0.1 percent to about 5 percent by weight of water.

Specific examples of polycondensation catalysts include tetraalkyl titanates, dialkyltin oxide, tetraalkyltin, dialkyltin oxide hydroxide, aluminum alkoxides, alkyl zinc, dialkyl zinc, zinc oxide, stannous oxide, dibutyltin oxide, butyltin oxide hydroxide, tetraalkyl tin such as dibutyltin dilaurate, mixtures thereof and the like selected in effective amounts of from about 0.01 mole percent to about 1 mole percent of resin.

Specific examples of sulfonated polyesters include the hydrogen, ammonium, alkali or alkali earth metals such as lithium, sodium, potassium, cesium, magnesium, barium, iron, copper, vanadium, cobalt, calcium of the random copoly(ethylene-terephthalate)-copoly-(ethylene-5-sulfo-isophthalate), copoly(propylene-terephthalate)-copoly-(propylene-5-sulfo-isophthalate), copoly(diethylene-terephthalate)-copoly-(diethylene-5-sulfo-isophthalate), copoly(propylene-diethylene-terephthalate)-copoly(propylene-diethylene-5-sulfo-isophthalate), copoly(propylene-butylene-terephthalate)-copoly-(propylene-butylene-5 -sulfo-isophthalate), copoly-(propoxylated bisphenol-A-fumarate)-copoly(propoxylated bisphenol A-5-sulfo-isophthalate), copoly(ethoxylated bisphenol-A-fumarate)-copoly(ethoxylated bisphenol A-5-sulfo-isophthalate), copoly(ethoxylated bisphenol-A-maleate)-copoly(ethoxylated bisphenol A-5-sulfo-isophthalate), mixtures thereof and the like, and wherein the sulfonated copoly portion is present in an amount of, for example, from about 0.5 to about 8 mole percent of the resin. For the aforementioned sulfonated polyester resins, the glass transition temperature can be selected to be from about 45° C. to about 65° C. as measured by the Differential Scanning Calorimeter, the number average molecular weight can be selected to be from about 2,000 grams per mole to about 150,000 grams per mole, the weight average molecular weight can be selected to be from about 3,000 grams per mole to about 300,000 grams per mole as measured by the Gel Permeation Chromatograph, and the polydispersity can be selected to be from about 1.6 to about 100 as calculated by the ratio of the weight average to number average molecular weight.

Percentage amounts of components are based on the total toner components unless otherwise indicated.

In embodiments, the present invention is directed to a toner composition comprised of a pigment, and a sulfonated polyester of the formula or as essentially represented by the formula

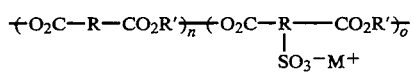

wherein M is an ion independently selected from the group consisting of hydrogen, ammonium, an alkali metal ion, an alkaline earth metal ion and a metal ion; R is independently selected from the group consisting of aryl and alkyl; R' is independently selected from the group consisting of alkyl and oxyalkylene; and wherein n and o represent random segments, and wherein o is from about 0.5 to about 8 mole percent, and wherein the sum of n and o are equal to 100 mole percent; and an in situ process for the preparation of toner compositions which comprises the dispersion of the above sulfonated polyester in a sealed vessel containing an aqueous media of an anionic surfactant, and a nonionic surfactant at a temperature of from about 100° C. to about 180° C. thereby obtaining suspended particles of about 0.05 micron to about 2 microns in volume average diameter; subsequently homogenizing the resulting suspension at ambient temperature; followed by aggregating the mixture by adding thereto a mixture of cationic surfactant and pigment particles to effect aggregation of said pigment and sulfonated polyester particles; followed by heating the pigment-sulfonated polyester particle aggregates above the glass transition temperature of the sulfonated polyester causing coalescence of the aggregated particles to provide toner particles with an average particle volume diameter of from between about 3 to about 21 microns. Alkyl includes components with from 1 to about 25 carbon atoms, such as methyl, ethyl, propyl, butyl, pentyl, heptyl, octyl, nonyl and the like; aryl includes components with from 6 to about 24 carbon atoms such as phenyl, naphthyl, benzyl, and the like; and oxyalkylene includes alkylene with from 1 to about 25 carbon atoms like methylene, ethylene, propylene, butylene hexylene, and the like. The subscripts n and o represent various amounts of the segments indicated providing the sum thereof is equal to 100 percent; preferably o is from about 0.5 to about 8 mole percent, and n is from about 95.5 to about 92 mole percent.

Known additives may be included in or with the toner of the present invention, such as charge additives like quaternary compounds, alkyl pyridium halides, distearyl dimethyl ammonium methyl sulfate, mixtures thereof, and the like, in effective amounts of, for example, from about 0.1 to 10 weight percent; waxes like polypropylene and polyethylene, preferably of a molecular weight of from 1,000 to about 20,000; surface additives like metal salts of fatty acids; colloidal silicas like AEROSIL R972 ®; metal oxides like tin oxide, titanium oxides and the like, present in effective amounts, such as from about 0.1 to 3 weight percent; and the like. Developer compositions comprised of the toners illustrated herein and carrier particles, including those as illustrated in U.S. Pat. Nos. 4,937,166 and 4,935,326, the disclosures of which are totally incorporated herein by reference, are also encompassed by the present invention.

The following Examples are being submitted to further define various species of the present invention. These Examples are intended to be illustrative only and are not intended to limit the scope of the present invention. Also, parts and percentages are by weight unless otherwise indicated.

EXAMPLE I

Preparation of sulfonated polyester resin derived from 46 mole percent of dimethylterephthalate, 4 mole percent of dimethyl-5-sulfoisophthalate sodium salt, 42.5 mole percent of 1,2-propylene glycol and 7.5 mole percent of diethylene glycol:

A one liter Parr reactor equipped with a bottom drain valve, double turbine agitator and distillation receiver with a cold water condenser was charged with 361 grams of dimethylterephthalate, 20.76 grams of dimethyl-5-sulfo-isophthalate sodium salt, 274.6 grams of 1,2-propanediol (1 mole excess), 31 grams of diethylene glycol and 0.8 gram of tetrabutyl titanate as the catalyst. The reactor was then heated to 165° C. with stirring for 16 hours whereby 115 grams of distillate was collected in the distillation receiver, which distillate was comprised of about 98 percent by volume of methanol and 2 percent by volume of 1,2-propanediol as measured by the ABBE refractometer available from American Optical Corporation. The mixture was then heated to 190° C. over a one hour period, after which the pressure was slowly reduced over a one hour period to about 260 Torr, and then reduced to 5 Torr over a two hour period with the collection of approximately 120 grams of distillate in the distillation receiver, which distillate was comprised of approximately 97 percent by volume of 1,2-propanediol and 3 percent by volume of methanol as measured by the ABBE refractometer. The pressure was then further reduced to about 1 Torr over a 30 minute period whereby an additional 18 grams of 1,2-propanediol were collected. The reactor was then purged with nitrogen to atmospheric pressure, and the polymer discharged through the bottom drain onto a container cooled with dry ice to yield 454 grams of copoly(1,2-propylene-diethylene-terephthalate) copoly(1,2-propylene-diethylene-5-sulfo-isophthalate) sodium salt resin. The glass transition temperature of the resin resulting was then measured to be 53° C. (onset) utilizing the 910 Differential Scanning Calorimeter available from E.I. DuPont operating at a heating rate of 10° C. per minute. The number average molecular weight was measured to be 2,050 grams per mole and the weight average molecular weight was measured to be 3,400 grams per mole using tetrahydrofuran as the solvent and obtained with the 700 Satelite WISP gel permeation chromatograph available from Waters Company equipped with a styrogel column. 1.8 Grams of this sulfonated polyester resin was then pressed into a pellet of about 1 centimeter in diameter and about 10 centimeters in length using the press and die set supplied by Shimadzu with the Flowtester 500 series. The pressed sample pellet was then loaded in the flowtester and subjected to the standard Shimadzu conditions using 20 killigrams/cm$^2$, and where the barrel temperature heated from 20° C. to 130° C. at a rate of 10° C. per minute. For the resin of this Example, a softening point of 68° C., beginning of flow temperature $T_1$ of 82° C., and flow temperature $T_2$ of 98° C. were obtained.

EXAMPLE II

A 5.0 micron toner comprised of the sulfonated polyester of Example I, and HOSTAPERM PINK E ™ pigment was prepared as follows.

One hundred (100) grams of the sulfonated polyester of Example I were dispersed in an aqueous mixture containing 400 grams of one percent by weight of polyoxyethylene nonylphenyl ether (available from Rhone Poulenac as ANTAROX 897 ™) and one percent by weight of sodium dodecylsulfate, utilizing a homogenizer available from APV Gaulin Incorporated, operating at 10,000 revolution per minute for a duration of 720 seconds at an elevated temperature of 150° C. The resultant mixture was then cooled to about 25° C. resulting in a mixture of microsuspended polyester particles with average volume particle size of about 150 nanometers as measured using the Brookhaven nanosizer. In a separate 200 milliliter vessel was dispersed HOSTAPERM PINK E ™ (Hoechst Celanese) in 100 grams of an aqueous solution containing one percent of MIRAPOL ™ (available from Miranol Inc.) utilizing a Brinkmann homogenizer operating at 10,000 revolutions per minute for a duration of 720 seconds. The dispersed pigment solution was then added to the 2 liter kettle containing the microsuspended polyester particles resulting in a flocculation of polyester particles and pigment. This mixture was then dispersed utilizing a Brinkmann homogenizer operating at 4,000 revolutions per minute for a duration of 3 minutes, wherein an aggregated composite of sulfonated polyester and pigment particles were obtained with an average volume diameter particle size of 4.8 microns as measured utilizing the Coulter Counter. The resulting aggregate composite was subsequently heated to 60° C. for a duration of 1 hour. The mixture was then cooled to ambient temperature, about 25° C., filtered off and washed repeatedly three times with about 1 liter of water. The wet toner cake was then fluidized in an Aeromatic AG bed dryer operated at 30° C. for a duration of 3 hours. The dry toner particles had a volume average particle size of 5 microns in diameter and a geometric distribution of 1.33 as determined by a Coulter Counter.

A developer composition was prepared by roll milling the aforementioned toner, 3 parts by weight with 100 parts by weight of a Xerox Corporation 9200 carrier comprised of a steel core with a 1.75 coating weight of a terpolymer of styrene, butylmethacrylate and triethoxysilane. The tribo data was obtained using the known blow-off Faraday Cage apparatus, and the charge was measured to be −29 microcoulombs per gram. Unfused copies were then produced using a Xerox Corporation 9200 imaging apparatus with the fusing system disabled. The unfused copies were then subsequently fused on a test fuser using a process speed of 11.9 inches per second. Fusing evaluation of the toner indicated a minimum fixing temperature of about 131° C., and a hot-offset temperature of 180° C.

EXAMPLE III

A 4.7 micron toner comprised of the sulfonated polyester of Example I, and HELIOGEN BLUE ™ pigment (available from BASF) was prepared as follows.

One hundred (100) grams of the sulfonated polyester of Example I were dispersed in an aqueous mixture containing 400 grams of one percent by weight of polyoxyethylene nonylphenyl ether (available from Rhone Poulenac as ANTAROX 897 ™), and one percent by weight of sodium dodecylsulfate, utilizing a Gaulin homogenizer available from APV Gaulin Incorporated, operating at 10,000 revolutions per minute for a duration of 720 seconds at an elevated temperature of 150° C. The resultant mixture was then cooled to about 25° C., resulting in a mixture of microsuspended polyester particles with an average volume particle size of about 150 nanometers as measured using the Brookhaven nanosizer. In a separate 200 milliliter vessel was dispersed HELIOGEN BLUE ™ (BASF) in 100 grams of an aqueous solution containing one percent of MIRAPOL ™ (available from Miranol Inc.) utilizing a Brinkmann homogenizer operating at 10,000 revolutions per minute for a duration of 720 seconds. The dispersed pigment solution was then added to the 2 liter kettle containing the prepared microsuspended polyester particles resulting in a flocculation of polyester particles and pigment. This mixture was then dispersed utilizing a Brinkmann homogenizer operating at 4,000 revolutions per minute for a duration of 3 minutes, wherein an aggregated composite of the sulfonated polyester and pigment particles were obtained with an average volume diameter particle size of 4.7 microns as measured utilizing the Coulter Counter. The resulting aggregate composite was subsequently heated to 60° C. for a duration of 1 hour. The mixture was then cooled to ambient temperature, about 25° C., filtered off and washed three times with about 1 liter of water. The wet toner cake was then fluidized in an Aeromatic AG bed dryer operated at 30° C. for a duration of 3 hours. The resulting dry toner particles had a volume average particle size of 4.7 microns in diameter and a geometric distribution of 1.35 as determined by a Coulter Counter.

A developer composition was prepared by roll milling the aforementioned toner, 3 parts by weight, with 100 parts by weight of the aforementioned Xerox Corporation 9200 carrier comprised of a steel core. The tribo data was obtained using the known blow-off Faraday Cage apparatus, and the charge was measured to be −32 microcoulombs per gram. Unfused copies were then produced using a Xerox Corporation 9200 imaging apparatus with the fusing system disabled. The unfused copies were then subsequently fused on a test fuser like the 9200 using a process speed of 11.9 inches per second. Fusing evaluation of the toner indicated a minimum fixing temperature of about 133° C., and a hot-offset temperature of 180° C.

EXAMPLE IV

Preparation of sulfonated polyester resin derived from 46 mole percent of dimethylterephthalate, 6 mole percent of dimethyl-5-sulfoisophthalate sodium salt, 42.5 mole percent and 1,2-propylene glycol and 7.5 percent of diethylene glycol:

A one liter Parr reactor equipped with a bottom drain valve, double turbine agitator and distillation receiver with a cold water condenser was charged with 353 grams of dimethylterephthalate, 31.14 grams of dimethyl-5-sulfo-isophthalate sodium salt, 274.6 grams of 1,2-propanediol (1 mole excess), 31 grams of diethylene glycol and 0.8 gram of tetrabutyl titanate as the catalyst. The reactor was then heated to 165° C. with stirring for 16 hours whereby 112 grams of distillate was collected in the distillation receiver, which distillate was comprised of about 98 percent by volume of methanol and 2 percent by volume of 1,2-propanediol as measured by the ABBE refractometer available from American Optical Corporation. The mixture was then heated to 190° C. over a one hour period, after which the pressure was slowly reduced over a one hour period to about 260 Torr, and then reduced to 5 Torr over a two hour period with the collection of approximately 122 grams of distillate in the distillation receiver comprised of approximately 97 percent by volume of 1,2-propanediol and 3 percent by volume of methanol as measured by the ABBE refractometer. The pressure was then further reduced to about 1 Torr over a 30 minute period whereby an additional 18 grams of 1,2-propanediol were collected. The reactor was then purged with nitrogen to atmospheric pressure, and the polymer discharged through the bottom drain onto a container cooled with dry ice to yield 450 grams of copoly(1,2-propylene-diethylene-5-sulfo-isophthalate) sodium salt resin. The glass transition temperature was then measured to be 58° C. (onset) utilizing the 910 Differential Scanning Calorimeter available from DuPont operating at a heating rate of 10° C. per minute. The number average molecular weight was measured to be 2,900 grams per mole and the weight average molecular weight was measured to be 4,100 grams per mole using tetrahydrofuran as the solvent and obtained with the 700 Satelite WISP gel permeation chromatograph available from Waters Company equipped with a styrogel column. 1.8 Grams of this sulfonated polyester resin was then pressed into a pellet of about 1 centimeter in diameter and about 10 centimeters in length using the press and die set supplied by Shimadzu with the Flow-tester 500 series. The pressed sample pellet was then loaded in the flowtester and subjected to the standard Shimadzu conditions using 20 killigrams/cm$^2$, and wherein a barrel temperature from 20° C. to 130° C. at a rate of 10° C. per minute was selected. For the resin of this Example, a softening point of 75° C., beginning of flow temperature $T_1$ of 89° C., and flow temperature $T_2$ of 103° C. were obtained.

EXAMPLE V

A 7 micron (average volume diameter throughout unless otherwise indicated) toner comprised of the sulfonated polyester of Example IV, and HELIOGEN BLUE TM (BASF) pigment was prepared as follows.

One hundred (100) grams of the sulfonated polyester of Example IV were dispersed in an aqueous mixture containing 400 grams of one percent by weight of polyoxyethylene nonylphenyl ether (available from Rhone Poulenac as ANTAROX 897 TM), and 1 percent by weight of sodium dodecylsulfate, utilizing a Gaulin homogenizer available from APV Gaulin Incorporated operating at 10,000 revolution per minute for a duration of 720 seconds at an elevated temperature of 150° C. The resultant mixture was then cooled to about 25° C., resulting in a mixture of microsuspended polyester particles with average volume particle size of about 130 nanometers as measured using the Brookhaven nanosizer. In a separate 200 milliliter vessel was dispersed HELIOGEN BLUE TM (BASF) in 100 grams of an aqueous solution containing one percent of MIRA-POL TM (available from Miranol Inc.) utilizing a Brinkmann homogenizer operating at 10,000 revolutions per minute for a duration of 720 seconds. The dispersed pigment solution was then added to the 2 liter kettle containing the above prepared microsuspended polyester particles resulting in a flocculation of polyester particles and pigment. This mixture was then dispersed utilizing a Brinkmann homogenizer operating at 4,000 revolutions per minute for a duration of 3 minutes, and an aggregated composite of sulfonated polyester and pigment particles was obtained with an average volume diameter particle size of 7 microns, as measured by the Coulter Counter. The resulting aggregate composite was subsequently heated to 65° C. for a duration of 2 hours. The mixture was then cooled to ambient temperature, about 25° C., filtered off and washed three times with about 1 liter of water. The wet toner cake was then fluidized in an Aeromatic AG bed dryer operated at 30° C. for a duration of 3 hours. The resulting dry toner particles had a volume average particle size of 7 microns in diameter and a geometric distribution of 1.32 as determined by a Coulter Counter.

A developer composition was prepared by roll milling the aforementioned toner, 3 parts by weight, with 100 parts by weight of the aforementioned carrier comprised of a steel core with a terpolymer coating. The tribo data was obtained using the known blow-off Faraday Cage apparatus, and the charge (toner throughout unless otherwise indicated) was measured to be −21 microcoulombs per gram. Unfused copies were then produced using a Xerox Corporation 9200 imaging apparatus with the fusing system disabled. The unfused copies were then subsequently fused on a test fuser using a process speed of 11.9 inches per second. Fusing evaluation of the toner indicated a minimum fixing temperature of about 138° C., and a hot-offset temperature of 190° C.

EXAMPLE VI

Preparation of sulfonated polyester resin derived from 46 mole percent of dimethylterephthalate, 2 mole percent of dimethyl-5-sulfoisophthalate sodium salt, 42.5 mole percent of 1,2-propylene glycol and 7.5 mole percent of diethylene glycol:

A one liter Parr reactor equipped with a bottom drain valve, double turbine agitator and distillation receiver with a cold water condenser was charged with 368 grams of dimethylterephthalate, 10.4 grams of dimethyl-5-sulfo-isophthalate sodium salt, 274.6 grams of 1,2-propanediol (1 mole excess), 31 grams of diethylene glycol and 0.8 gram of tetrabutyl titanate as the catalyst. The reactor was then heated to 165° C. with stirring for 16 hours whereby 110 grams of distillate was collected in the distillation receiver comprised of about 98 percent by volume of methanol and 2 percent by volume of 1,2-propanediol as measured by the ABBE refractometer available from American Optical Corporation. The mixture was then heated to 190° C. over a one hour period, after which the pressure was slowly reduced over a one hour period to about 260 Torr, and then reduced to 5 Torr over a two hour period with collection of approximately 124 grams of distillate comprised of approximately 97 percent by volume of 1,2-propanediol and 3 percent by volume of methanol as measured by the ABBE refractometer. The pressure was then further reduced to about 1 Torr over a 30 minute period whereby an additional 18 grams of 1,2-propanediol was collected. The reactor was then purged with nitrogen to atmospheric pressure, and the polymer discharged through the bottom drain onto a container cooled with dry ice to yield 445 grams of copoly(1,2-propylene-diethylene-5-sulfo-isophthalate) sodium salt resin. The glass transition temperature was then measured to be 59° C. (onset) utilizing the 910 Differential Scanning Calorimeter available from DuPont operating at a heating rate of 10° C. per minute. The number average molecular weight was measured to be 2,990 grams per mole and the weight average molecular weight was measured to be 4,300 grams per mole using tetrahydrofuran as the solvent and obtained with the 700 Satelite WISP gel permeation chromatograph available from Waters Company equipped with a styrogel column. 1.8 Grams of this sulfonated polyester resin were then pressed into a pellet of about 1 centimeter in diameter and about 10 centimeters in length using the press and die set supplied by Shimadzu with the Flowtester 500 series. The pressed sample pellet was then loaded in the flowtester and subjected to the standard Shimadzu conditions using 20 killigrams/cm$^2$, and a barrel temperature heated from 20° C. to 130° C. at a rate of 10° C. per minute. For the resin of this Example, a softening point of 76° C., beginning of flow temperature T$_1$ of 91° C., and flow temperature T$_2$ of 105° C. were obtained.

EXAMPLE VII

A 6 micron toner comprised of the sulfonated polyester of Example VI, and HELIOGEN BLUE ™ pigment (BASF) was prepared as follows.

One hundred (100) grams of the sulfonated polyester of Example VI was dispersed in an aqueous mixture containing 400 grams of one percent by weight of polyoxyethylene nonylphenyl ether (available from Rhone Poulenac as ANTAROX 897 ™), and one percent by weight of sodium dodecylsulfate, utilizing a Gaulin homogenizer available from APV Gaulin Incorporated, operating at 10,000 revolution per minute for a duration of 720 seconds at an elevated temperature of 150° C. The resultant mixture was then cooled to about 25° C., resulting in a mixture of microsuspended polyester particles with average volume particle size of about 130 nanometers as measured using the Brookhaven nanosizer. In a separate 200 milliliter vessel was dispersed HELIOGEN BLUE ™ (BASF) in 100 grams of an aqueous solution containing one percent of MIRAPOL ™ (available from Miranol Inc.) utilizing a Brinkmann homogenizer operating at 10,000 revolutions per minute for a duration of 720 seconds. The dispersed pigment solution was then added to the 2 liter kettle containing the above prepared microsuspended polyester particles resulting in a flocculation of polyester particles and pigment. This mixture was then dispersed utilizing a Brinkmann homogenizer operating at 4,000 revolutions per minute for a duration of 3 minutes, wherein an aggregated composite of sulfonated polyester and pigment particles were obtained with an average volume diameter particle size of 6 microns was measured utilizing the Coulter Counter. The resulting aggregate composite was subsequently heated to 70° C. for a duration of 1 hour. The mixture was then cooled to ambient temperature, about 25° C., filtered off and washed three times with about 1 liter of water. The wet toner cake was then fluidized in an Aeromatic AG bed dryer operated at 30° C. for a duration of 3 hours. The resulting dry toner particles had a volume average particle size of 6 microns in diameter and geometric distribution of 1.34 as determined by a Coulter Counter.

A developer composition was prepared by roll milling the aforementioned toner, 3 parts by weight, with 100 parts by weight of the aforementioned terpolymer coated carrier. The tribo data was obtained using the known blow-off Faraday Cage apparatus, and the toner charge was measured to be −28 microcoulombs per gram. Unfused copies were then produced using a Xerox Corporation 9200 imaging apparatus with the fusing system disabled. The unfused copies were then subsequently fused on a test fuser using a process speed of 11.9 inches per second. Fusing evaluation of the toner indicated a minimum fixing temperature of about 142° C., and a hot-offset temperature of 200° C.

Other modifications of the present invention may occur to those skilled in the art subsequent to a review of the present application, and these modifications, including equivalents thereof, are intended to be included within the scope of the present invention.

What is claimed is:

1. A toner composition consisting essentially of pigment, and a sulfonated polyester of the formula or as essentially represented by the formula

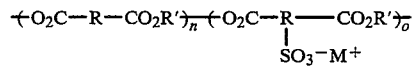

wherein M is an ion independently selected from the group consisting of hydrogen, ammonium, an alkali metal ion, an alkaline earth metal ion and a metal ion; R is independently selected from the group consisting of aryl and alkyl; R' is independently selected from the group consisting of alkyl and oxyalkylene; and wherein n and o represent random segments; and wherein the sum of n and o are equal to 100 mole percent.

2. A toner in accordance with claim 1 wherein the sulfonated polyester is derived from at least one dicarboxylic acid, at least one diol and at least one component of a sulfonated ion attached to a dicarboxylic acid or diol component.

3. A toner in accordance with claim 1 wherein R is selected from the group consisting of terephthalyl, isophthalyl, phthalyl, xylyl, 1,4-cyclohexyl, 1,3-cyclohexyl, 1,2-cyclohexyl, 1,4-naphthyl, 1,7-naphthyl, 1,6-naphthyl, 1,3 naphthyl, 1,2-naphthyl, 1,8-naphthyl, and biphenyl.

4. A toner in accordance with claim 1 wherein R' is methyl, ethyl, propyl, butyl, pentyl, hexyl, heptyl, octyl, nonyl, decyl, undecyl, dodecyl, stearyl, lauryl, neopentyl, 1,2-propyl, 1,2-butyl, 1,3-butyl, 2-pentyl, 2,2-dimethylpropyl, and an oxyalkylene of diethyleneoxide, dipropyleneoxide, triethyleneoxide, and mixture thereof.

5. A toner in accordance with claim 2 wherein the sulfonated polyester is derived from dimethyl terephthalate, dimethyl-5-sulfo-isophthalate sodium salt, 1,2-propanediol and diethylene glycol.

6. A toner in accordance with claim 2 wherein the dicarboxylic acid or diester is selected from the group consisting of terephthalic acid, phthalic acid, isophthalic acid, fumaric acid, maleic acid, succinic acid, itaconic acid, succinic anhydride, succinic anhydride, dodecylsuccinic acid, dodecylsuccinic anhydride, glutaric acid, glutaric anhydride, adipic acid, pimelic acid, suberic acid, azelic acid, dodecanediacid, dimethyl terephthalate, diethyl terephthalate, dimethylisophthalate, diethylisophthalate, dimethylphthalate, phthalic anhydride, diethylphthalate, dimethylsuccinate, dimethylfumarate, dimethylmaleate, dimethylglutarate, dimethyladipate, dimethyl dodecylsuccinate, and mixtures thereof.

7. A toner in accordance with claim 2 wherein the diol is selected from the group consisting of ethanediol, 1,2-propanediol, 1,3-propanediol, 1,2-butanediol, 1,3-butanediol, 1,4-butanediol, pentanediol, hexanediol, 2,2-dimethylpropanediol, 2,2,3-trimethylhexanediol, heptanediol, dodecanediol, bis(hyroxyethyl)-bisphenol A, bis(2-hyroxypropyl)-bisphenol A, 1,4-cyclohexanedimethanol, 1,3-cyclohexanedimethanol, xylenedimethanol, cyclohexanediol, diethylene glycol, bis(2-hydroxyethyl) oxide, dipropylene glycol, dibutylene, and mixtures thereof.

8. A toner in accordance with claim 2 wherein the sulfonated component is comprised of hydrogen, ammonium, lithium, sodium, potassium, cesium, beryllium, magnesium, calcium, barium, strontium, iron, copper, vanadium, chromium, manganese, and cobalt of the sulfonated difunctional monomer dimethyl-5-sulfo-isophthalate, dialkyl-5-sulfo-isophthalate-4-sulfo-1,8-naphthalic anhydride, 4-sulfo-phthalic acid, dimethyl-4-sulfo-phthalate, dialkyl-4-sulfo-phthalate, 4-sulfophenyl-3,5-dicarbomethoxybenzene, 6-sulfo-2-naphthyl-3,5-dicarbomethoxybenzene, sulfo-terephthalic acid, dimethyl-sulfo-terephthalate, 5-sulfo-isophthalic acid, dialkyl-sulfo-terephthalate, sulfoethanediol, 2-sulfopropanediol, 2-sulfobutanediol, 3-sulfopentanediol, 2-sulfohexanediol, 3-sulfo-2-methylpentanediol, 2-sulfo-3,3-dimethylpentanediol, sulfo-p-hydroxybenzoic acid, N,N-bis(2-hydroxyethyl)-2-amino ethane sulfonate, or mixtures thereof.

9. A toner in accordance with claim 2 wherein the sulfonated component is dimethyl 5-sulfo-isophthalate sodium salt.

10. A toner in accordance with claim 1 wherein the sulfonated polyester is comprised of M+ ions of random copoly(ethylene-terephthalate)-copoly-(ethylene-5-sulfo-isophthalate), copoly(propylene-terephthalate)-copoly-(propylene-5-sulfo-isophthalate), copoly(-diethylene-terephthalate)-copoly-(diethylene-5-sulfo-isophthalate), copoly(propylene-diethylene-terephthalate)-copoly-(propylene-diethylene-5-sulfoisophthalate), copoly(propylene-butylene-terephthalate)-copoly(propylene-butylene-5-sulfo-isophthalate), copoly(propoxylated bisphenol-A-fumarate)-copoly(-propoxylated bisphenol A-5-sulfo-isophthalate), copoly(ethoxylated bisphenol-A-fumarate)-copoly(ethoxylated bisphenol-A-5-sulfo-isophthalate), copoly(ethoxylated bisphenol-A-maleate)copoly(ethoxylated bisphenol-A-5-sulfo-isophthalate), and mixtures thereof.

11. An in situ process for the preparation of toner compositions which comprises the dispersion of a sulfonated polyester of the formula or as essentially represented by the formula

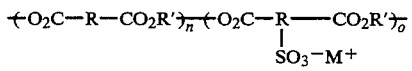

wherein M is an ion independently selected from the group consisting of hydrogen, ammonium, an alkali metal ion, an alkaline earth metal ion and a metal ion; R is independently selected from the group consisting of aryl and alkyl; R' is independently selected from the group consisting of alkyl and oxyalkylene; and wherein n and o represent random segments; and wherein the sum of n and o are equal to 100 mole percent in a vessel containing an aqueous media of an anionic surfactant, and a nonionic surfactant at a temperature of from about 100° C. to about 180° C. thereby obtaining suspended particles of about 0.05 micron to about 2 microns in volume average diameter; subsequently homogenizing the resulting suspension at ambient temperature; followed by aggregating the mixture by adding thereto a mixture of cationic surfactant and pigment particles to effect aggregation of said pigment and sulfonated polyester particles; followed by heating the pigment-sulfonated polyester particle aggregates above the glass transition temperature of the sulfonated polyester causing coalescence of the aggregated particles to provide toner particles with an average particle volume diameter of from between 3 to 21 microns.

12. An in situ process in accordance with claim 11 wherein the dispersion of the polyester is accomplished by homogenization operated at from about 2,000 revolutions per minute to about 10,000 revolutions per minute for a duration of from about 1 minute to about 300 minutes.

13. A process in accordance with claim 11 wherein the anionic surfactant is selected from the group consisting of sodium dodecyl sulfate, sodium dodecyl benzene sulfate, sodium dodecyl naphthalene sulfate, sodium lauryl sulfate, triethanolamine lauryl sulfate, ammonium lauryl sulfate, sodium alkyl naphthalene sulfonate, sodium dialkyl sulfosuccinate, sodium alkyl diphenyl ether disulfonate, potassium salt of alkylphosphate, sodium polyoxyethylene lauryl ether sulfate, sodium polyoxyethylene alkyl sodium alkane sulfonate, and potassium alkylsulfonate; and which surfactant is selected in an effective amount of from about 0.1 to about 5 percent by weight of the aqueous mixture.

14. A process in accordance with claim 11 wherein the pigment is carbon black.

15. A process in accordance with claim 11 wherein the nonionic surfactant is selected from the group consisting of polyvinyl alcohol, polyacrylic acid, methalose, methyl cellulose, ethyl cellulose, propyl cellulose, hydroxy ethyl cellulose, carboxy methyl cellulose, polyoxyethylene cetyl ether, polyoxyethylene lauryl ether, polyoxyethylene octyl ether, polyoxyethylene octyphenyl ether, polyoxyethylene oleyl ether, polyoxyethylene sorbitan monolaurate, polyoxyethylene stearyl ether, and polyoxyethylene nonylphenyl ether; and which surfactant is selected in an effective amount of from about 0.1 to about 5 percent by weight of the aqueous fraction.

16. A process in accordance with claim 11 wherein the pigment is cyan, magenta, or yellow.

17. A process in accordance with claim 11 wherein there is added to the toner product surface additives of metal salts, metal salts of fatty acids, silicas, or mixtures thereof.

18. A process in accordance with claim 11 wherein the pigment is present in an amount of from about 0.1 to about 10 weight percent.

19. A process in accordance with claim 11 wherein there is formed aggregated pigment-sulfonated polyester particles of from about 3 to about 21 microns in volume average diameter size.

20. A process in accordance with claim 11 wherein there are formed coalesced toner particles of from about 3 to about 21 microns in volume average diameter size.

21. A toner in accordance with claim 1 wherein the pigment is carbon black, cyan, magenta, or yellow.

22. A toner in accordance with claim 1 wherein the toner average volume particle diameter size is from about 3 to about 21 microns.

23. A toner in accordance with claim 1 wherein the number average molecular weight of the sulfonated polyester is from about 2,000 grams per mole to about 150,000 gram per mole, and the weight average molecular weight is from about 4,000 gram per mole to about 300,000 gram per mole.

24. A toner in accordance with claim 1 wherein the alkali or alkaline earth metal ion is lithium, sodium, potassium, cesium, beryllium, magnesium, calcium, barium, or strontium.

25. A toner in accordance with claim 1 wherein the metal ion is iron, copper, vanadium, chronium, manganese, cobalt, or mixtures thereof.

26. A toner in accordance with claim 1 wherein o is present in an amount of from about 0.5 to about 8 mole percent.

27. A toner in accordance with claim 1 wherein alkyl contains from 1 to about 25 carbon atoms; aryl contains from 6 to about 24 carbon atoms; and oxyalkylene contains from 1 to about 20 carbon atoms.

28. A developer composition comprised of the toner of claim 1, and carrier particles.

* * * * *